(12) United States Patent  
Fujii

(10) Patent No.: US 7,350,436 B2
(45) Date of Patent: Apr. 1, 2008

(54) ELECTRICAL BICYCLE SHIFT CONTROL DEVICE

(75) Inventor: Kazuhiro Fujii, Kawachinagano (JP)

(73) Assignee: Shimano, Inc., Osaka (JP)

( * ) Notice: Subject to any disclaimer, the term of this patent is extended or adjusted under 35 U.S.C. 154(b) by 730 days.

(21) Appl. No.: 10/810,571

(22) Filed: Mar. 29, 2004

(65) Prior Publication Data

US 2005/0211014 A1    Sep. 29, 2005

(51) Int. Cl.
*B62M 25/08* (2006.01)
(52) U.S. Cl. .................. 74/473.13; 74/473.12; 74/551.8; 280/261
(58) Field of Classification Search .................. 74/469, 74/473.12, 473.13, 551.8; 280/260, 261; 200/61.85
See application file for complete search history.

(56) References Cited

U.S. PATENT DOCUMENTS

| 4,143,557 | A |   | 3/1979  | Wakebe et al. |         |
|-----------|---|---|---------|---------------|---------|
| 4,900,291 | A | * | 2/1990  | Patterson     | 474/80  |
| 5,358,451 | A |   | 10/1994 | Lacombe et al.|         |
| 5,400,675 | A |   | 3/1995  | Nagano        |         |
| 5,470,277 | A |   | 11/1995 | Romano        |         |
| 5,653,649 | A |   | 8/1997  | Watarai       |         |
| 5,678,455 | A |   | 10/1997 | Watarai       |         |
| 5,768,945 | A |   | 6/1998  | Ose           |         |
| 5,941,125 | A |   | 8/1999  | Watarai et al.|         |
| 6,015,036 | A |   | 1/2000  | Fukuda        |         |
| 6,038,923 | A |   | 3/2000  | Lin           |         |
| 6,073,730 | A |   | 6/2000  | Abe           |         |
| 6,216,078 | B1|   | 4/2001  | Jinbo et al.  |         |
| 6,227,068 | B1|   | 5/2001  | Masui et al.  |         |
| 6,276,230 | B1| * | 8/2001  | Crum et al.   | 74/551.9|
| 6,546,827 | B2|   | 4/2003  | Irie          |         |
| 6,698,307 | B2|   | 3/2004  | Wesling et al.|         |
| 2001/0053724 | A1 | | 12/2001 | Campagnolo  |         |
| 2003/0019712 | A1 | | 1/2003  | Dal Pra'    |         |
| 2003/0074997 | A1 | | 4/2003  | Wesling et al.|        |

FOREIGN PATENT DOCUMENTS

| DE | 19642906 A1 | 4/1997 |
| EP | 1225123 A1  | 7/2002 |
| EP | 1375325 A2  | 1/2004 |
| FR | 2654698 A1  | 5/1991 |
| JP | 60-85297 U  | 6/1985 |
| JP | 5-338581 A  | 12/1993 |
| JP | 8-26174     | * 1/1996 |

OTHER PUBLICATIONS

Mavic All Catalogue 1999; Published in Japan before Nov. 5, 1998.

* cited by examiner

*Primary Examiner*—William C. Joyce
(74) *Attorney, Agent, or Firm*—Global IP Counselors, LLP

(57) ABSTRACT

An electrical bicycle shift control device is provided that includes a handlebar mounting portion and an electrical shift control switch portion. The handlebar mounting portion is configured to be fixedly mounted in a free end of a handlebar. The electrical shift control switch portion is fixedly mounted to the handlebar mounting portion. The electrical shift control switch portion includes an operating member arranged and configured to be selectively moved relative to the handlebar mounting portion between a neutral position and a first actuating position.

23 Claims, 14 Drawing Sheets

ELECTRICAL BICYCLE SHIFT CONTROL DEVICE

BACKGROUND OF THE INVENTION

1. Field of the Invention

This invention generally relates to an electrical bicycle shift control device. More specifically, the present invention relates to an electrical shift control device, which is configured to be mounted in the free end of a bicycle handlebar in an integrated manner to provide an additional location to control shifting.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been extensively redesigned is the bicycle shifting mechanism.

In the past, the operating force applied by the fingers to a shift control lever was transmitted to the drive component of a bicycle shifting mechanism by a cable that was fixed at one end to the control lever. More recently, electric switches mounted on the handlebar have been used instead of mechanical control levers in order to operate the bicycle shifting mechanism. For example, as shown in Japanese Laid-Open Patent Application No. 5-338581 and U.S. Pat. No. 5,358,451, a plurality of electric switches may be provided at a plurality of handlebar locations in order to allow for quicker shifts and to enhance responsiveness. However, it is often inconvenient to move the hands around the handlebar to operate the brakes and the electric switches depending on the hand position at a given time. Additionally, these typical braking devices and/or electric switches can be difficult or at least cumbersome to assemble and install on the bicycle. Furthermore, these typical braking devices and/or electric switches can be unsightly.

In view of the above, it will be apparent to those skilled in the art from this disclosure that there exists a need for an improved electrical shift control device. This invention addresses this need in the art as well as other needs, which will become apparent to those skilled in the art from this disclosure.

SUMMARY OF THE INVENTION

One object of the present invention is to provide a combination brake control and electrical bicycle shift control system that allows the rider to operate various bicycle control devices without difficulty by positioning control devices at various convenient locations.

Another object of the present invention is to provide an electrical bicycle shift control device for the control system that is relatively easy and convenient to operate at the end of the handlebar.

Still another object of the present invention is to provide an electrical bicycle shift control device for the control system that is relatively simple and inexpensive to manufacture and assemble.

Yet still another object of the present invention is to provide an electrical bicycle shift control device for the control system that is relatively easy to attach at the end of the bicycle handlebar.

The foregoing objects can basically be attained by providing an electrical bicycle shift control device that comprises a handlebar mounting portion and an electrical shift control switch portion. The handlebar mounting portion is configured to be fixedly mounted in a free end of a handlebar. The electrical shift control switch portion is fixedly mounted to the handlebar mounting portion. The electrical shift control switch portion includes an operating member arranged and configured to be selectively moved relative to the handlebar mounting portion between a neutral position and a first actuating position.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

A selected embodiment of the present invention will now be explained with reference to the drawings. It will be apparent to those skilled in the art from this disclosure that the following descriptions of the embodiment of the present invention are provided for illustration only and not for the purpose of limiting the invention as defined by the appended claims and their equivalents.

Figure 1:
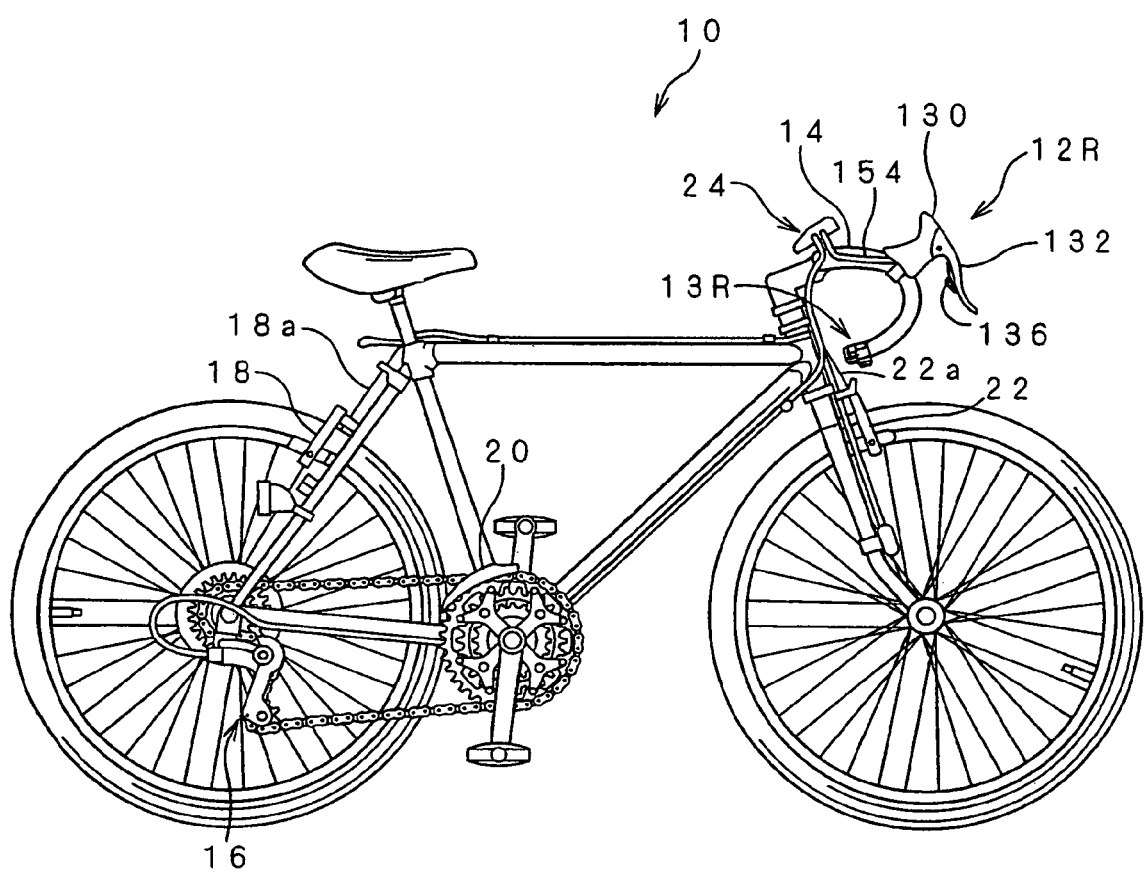
FIG. 1 is a side elevational view of a bicycle equipped with a pair of brake/shift control devices (only one shown) coupled to the handlebar and a pair of additional electrical shift control devices (only one shown) mounted to the free ends of the handlebar in accordance with a preferred embodiment of the present invention.
Figure 2:
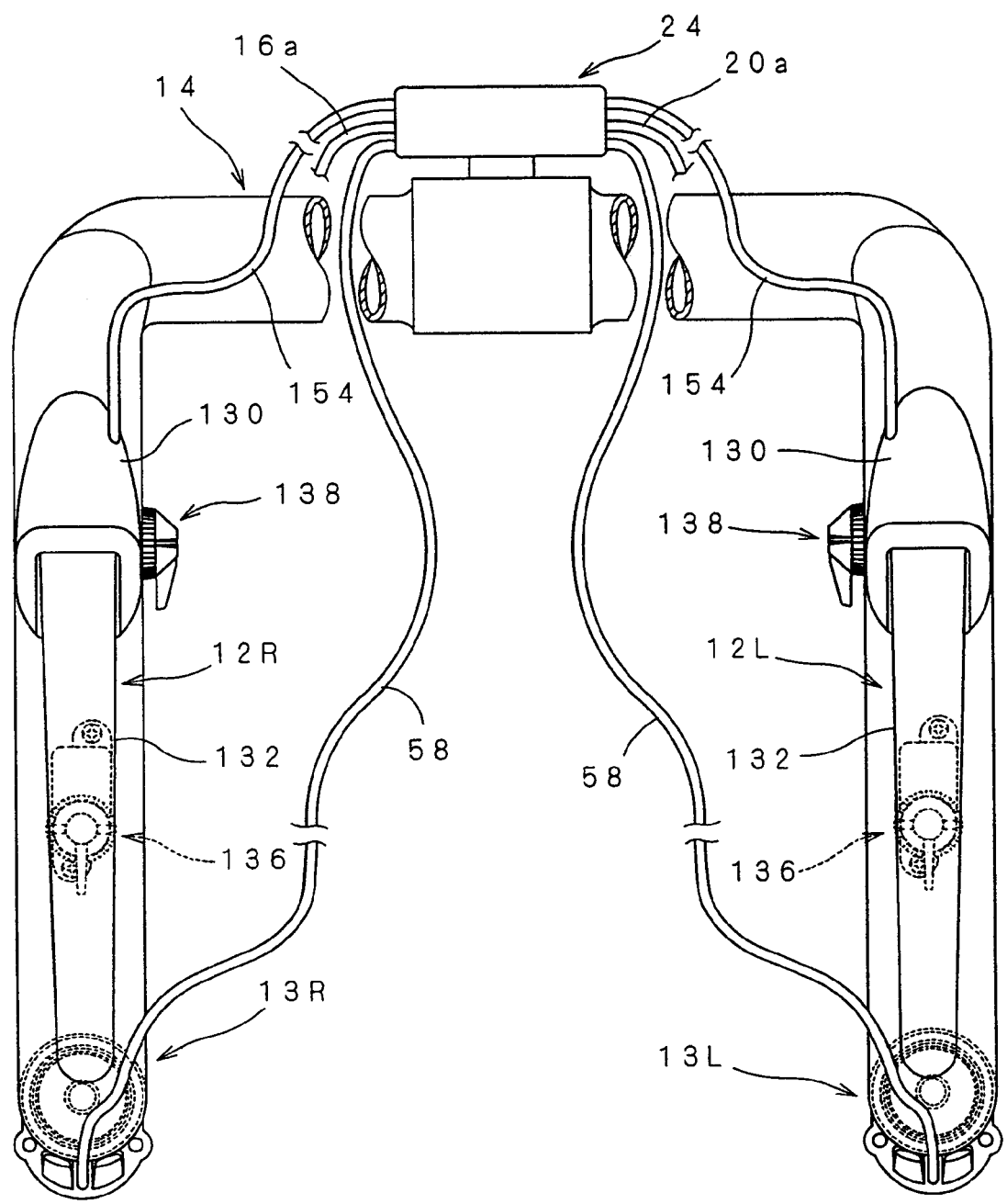
FIG. 2 is a partial enlarged front elevational view of the handlebar of the bicycle illustrated in FIG. 1 with the right and left side control devices coupled thereto in accordance with the present invention.
Figure 3:
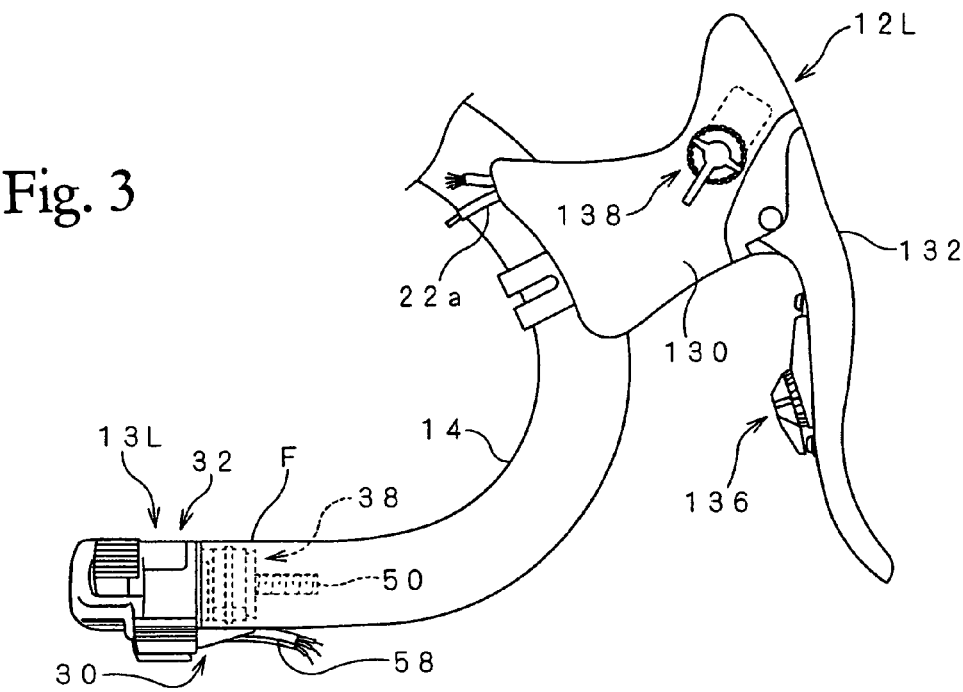
FIG. 3 is an enlarged inside elevational view of the left hand side portion of the bicycle handlebar illustrated in FIGS. 1 and 2 with the left brake/shift control device and the additional left electrical shift control device coupled thereto in accordance with the present invention.
Figure 4:
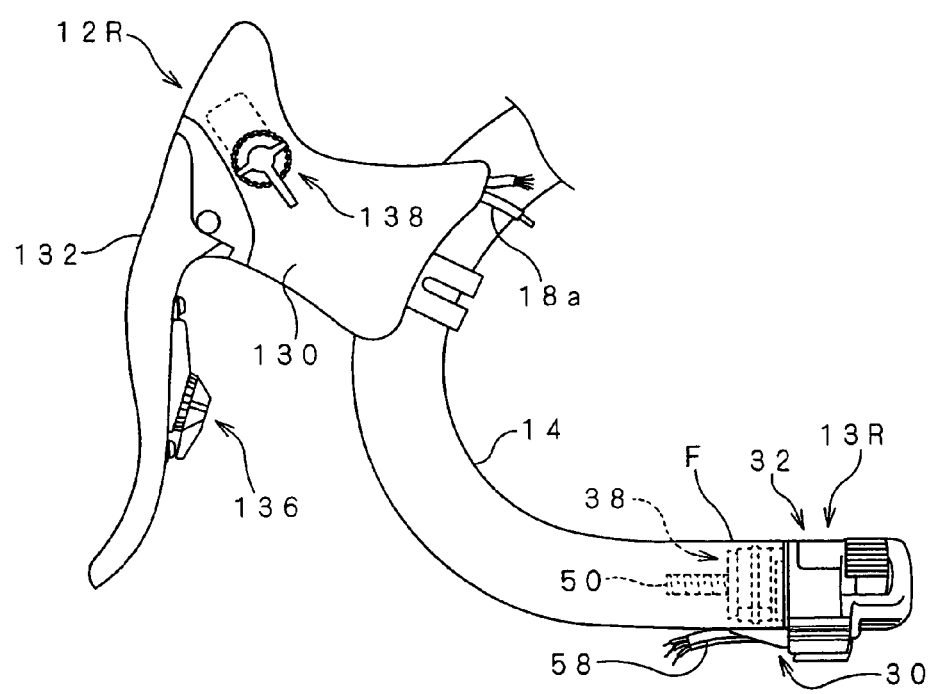
FIG. 4 is an enlarged inside elevational view of the right hand side portion of the bicycle handlebar illustrated in FIGS. 1 and 2 with the right brake/shift control device and the additional right electrical shift control device coupled thereto in accordance with the present invention.
Figure 5:
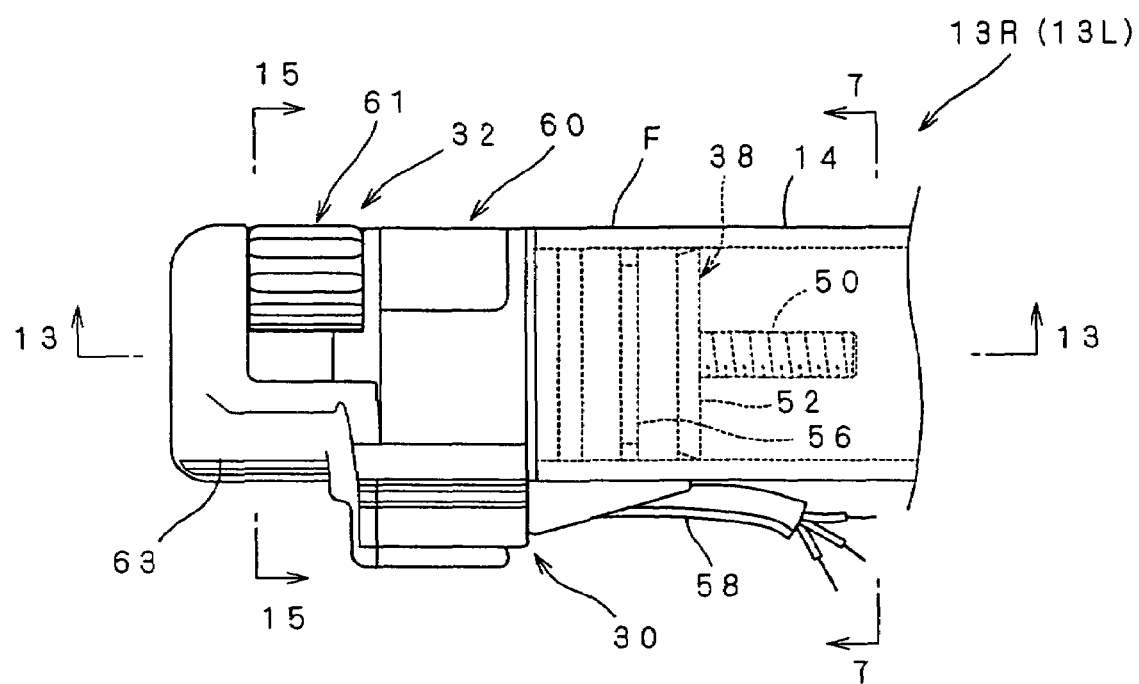
FIG. 5 is a further enlarged, partial outside elevational view of end of the right hand side portion of the bicycle handlebar illustrated in FIG. 4 with the additional right electrical shift control device coupled thereto in accordance with the present invention.
Figure 6:
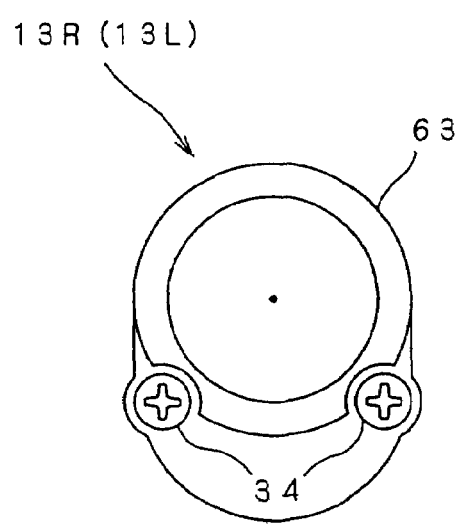
FIG. 6 is a rear end elevational view of the part of the end of the right hand side portion of the bicycle handlebar illustrated in FIG. 5 with the additional right electrical shift control device coupled thereto.

Referring initially to FIGS. 1 and 2, a bicycle 10 is illustrated with a pair of electrical shift/brake control devices 12R and 12L (only one shown in FIG. 1) and a pair of additional electrical shift control devices 13R and 13L (only one shown in FIG. 1) mounted on a bicycle handlebar 14 in accordance with the present invention. The electrical shift/brake control devices 12R and 12L and the additional electrical shift control devices 13R and 13L form parts of a brake and shift control system of the bicycle 10 in accordance with the present invention. The additional electrical shift control devices 13R and 13L are mounted at the free ends F of the handlebar 14 in accordance with the present invention, as explained below.

The right and left hand side control devices 12R and 12L are essentially identical in construction and operation, except that that are mirror images. Thus, only one of the control devices 12R and 12L will be discussed and illustrated herein. Moreover, the parts of right and left hand side control devices 12R and 12L that are identical or mirror images will be given the same reference numerals for the sake of brevity. The additional shift control devices 13R and 13L are also essentially identical in construction and operation, except that that are mirror images. Thus, only one of the shift control devices 13R and 13L will be discussed and illustrated herein. Moreover, the parts of right and left hand side shift control devices 13R and 13L that are identical or mirror images will be given the same reference numerals for the sake of brevity.

The right hand side control device 12R is operatively coupled to a rear derailleur 16 via a cycle computer 24, while the left hand side control device 12L is operatively coupled to a front derailleur 20 via the cycle computer 24. The additional right hand side shift control device 13R is also operatively coupled to the rear derailleur 16 via the cycle computer 24, while the additional left hand side shift control device 13L is also operatively coupled to the front derailleur 20 via the cycle computer 24. Additionally, the right hand side control device 12R is preferably directly mechanically coupled to a rear braking device 18 via a brake cable 18a, while the left hand side control device 12L is preferably directly mechanically coupled to a front braking device 22 via a brake cable 22a. The cycle computer 24 also forms a part of the brake and shift control system of the bicycle 10 mentioned above.

The brake and shift control system of the bicycle 10 controls the rear derailleur 16, the rear braking device 18, the front derailleur 20 and the front braking device 22. In particular, the brake and shift control system of the bicycle 10 mechanically controls the rear braking device 18 and the front braking device 22, while the brake and shift control system of the bicycle 10 electronically controls the rear derailleur 16 and the front derailleur 20. Thus, brake and shift control system of the bicycle 10 preferably includes a conventional mechanical brake control system and an electrical shift control system in accordance with the present invention, as explained below.

Since most of the parts of the bicycle 10 are well known in the art, the parts of the bicycle 10 will not be discussed or illustrated in detail herein, except for the parts relating to the present invention. Moreover, various conventional bicycle parts, which are not illustrated and/or discussed in detail herein, can also be used in conjunction with the present invention. In other words, it will be apparent to those skilled in the art from this disclosure that various modifications can be made to the various parts of the bicycle 10 without departing from the present invention, as needed and/or desired.

Referring now to FIGS. 3-10, the additional electrical shift control devices 13R and 13L will now be discussed in more detail. Basically, each of the shift control devices 13R and 13L includes a handlebar mounting portion 30 that is configured to be fixedly mounted in a free end of a handlebar 14 and an electrical shift control switch portion 32 fixedly mounted to the handlebar mounting portion 30 via a pair of threaded fasteners or screws 34. For the sake of convenience, the "electrical shift control switch portion 32" will also simply be referred to as "the electrical switch portion 32" hereinafter. When the fasteners 34 are removed, the electrical (shift control) switch portions 32 can be removed from the handlebar mounting portions 30 without removing the handlebar mounting portions 30 from the handlebar 14. The electrical (shift control) switch portions 32 of the shift control devices 13R and 13L are utilized by the rider to shift the rear derailleur 16 and the front derailleur 20, respectively.

Figure 11:
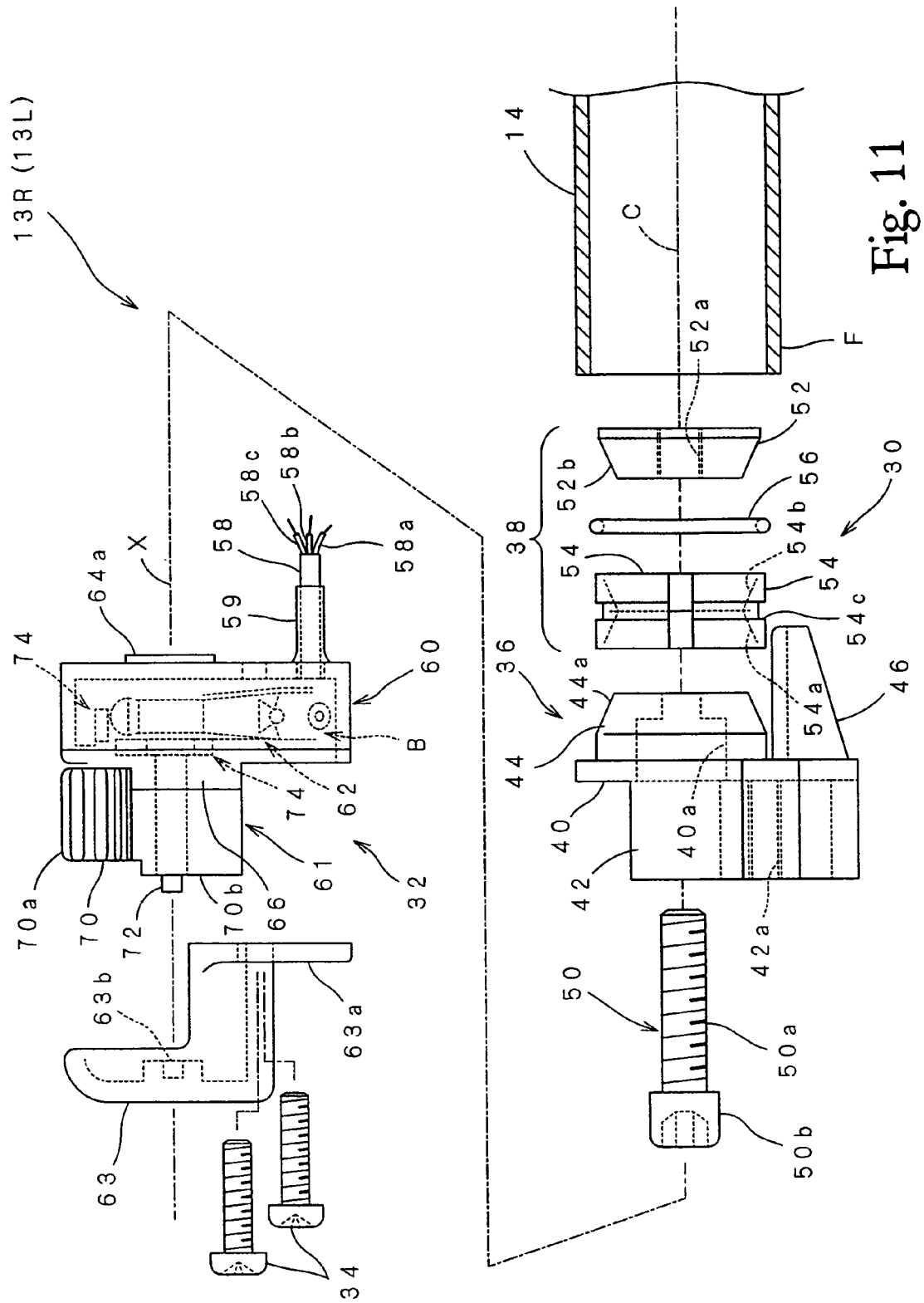
FIG. 11 is an exploded side elevational view of the additional right electrical shift control device illustrated in FIGS. 5-10, prior to coupling the additional right electrical shift control device to the end portion of the handlebar.
Figure 12:
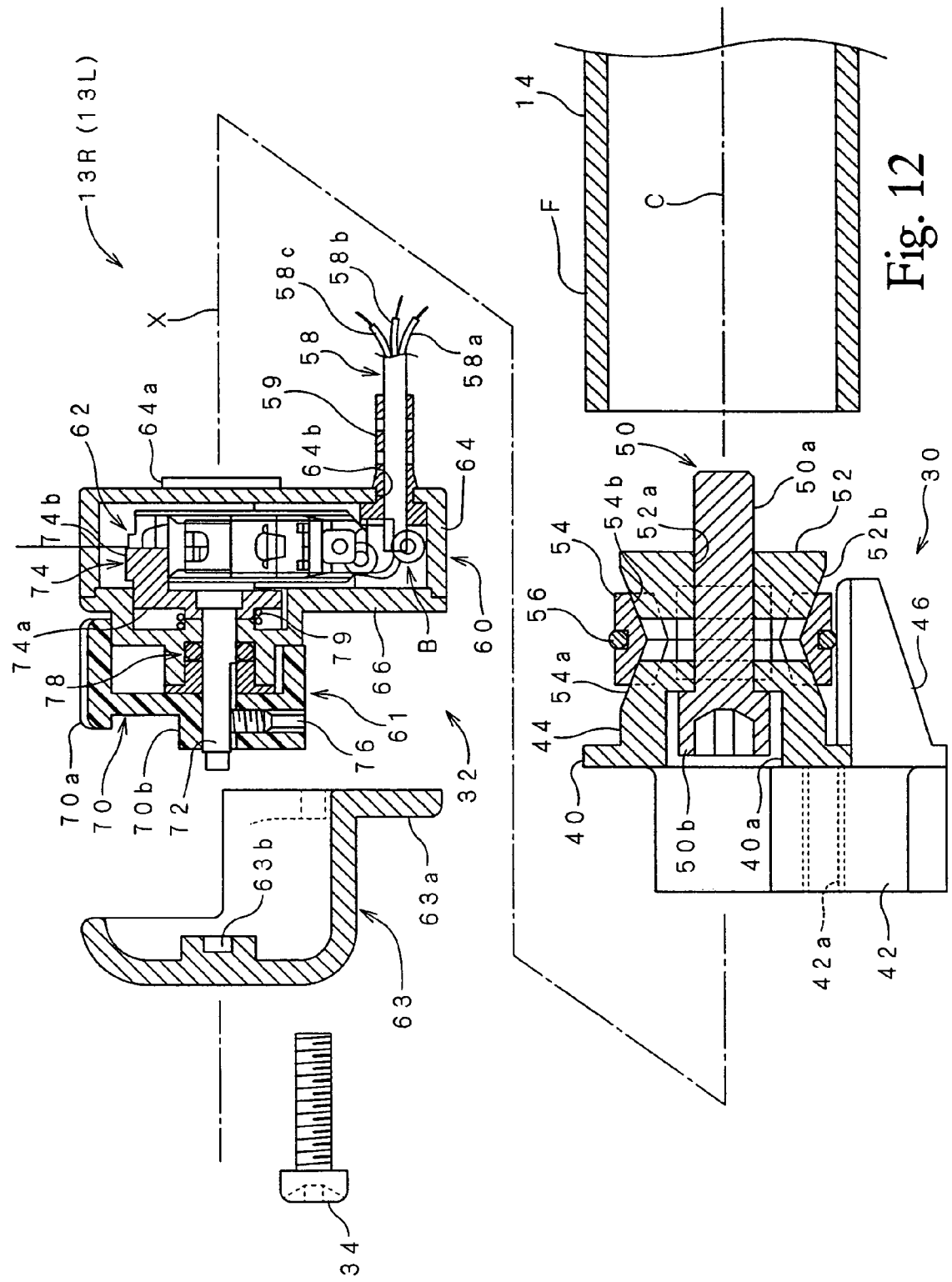
FIG. 12 is a partially exploded cross-sectional view of the additional right electrical shift control device illustrated in FIGS. 5-10 as seen along section line 12-12 of FIG. 8, prior to coupling the additional right electrical shift control device to the end portion of the handlebar.
Figure 13:
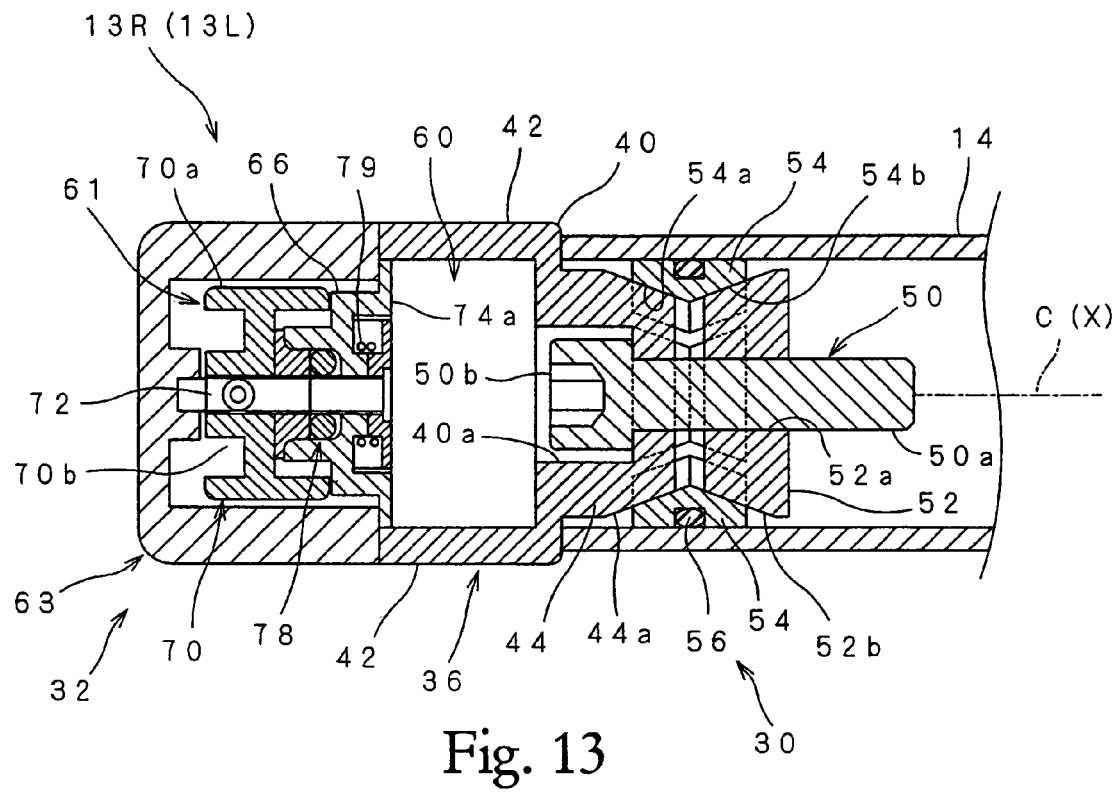
FIG. 13 is a cross-sectional view of the additional right electrical shift control device illustrated in FIGS. 5-10 as seen along section line 13-13 of FIG. 5, after coupling the additional right electrical shift control device to the end portion of the handlebar.
Figure 14:
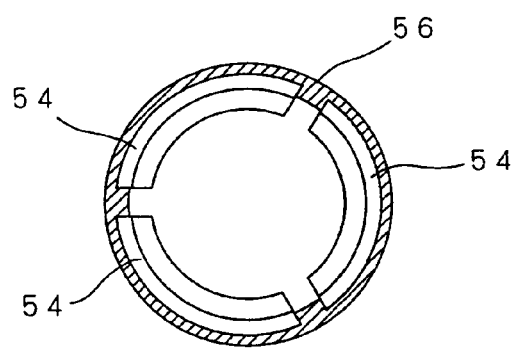
FIG. 14 is an end elevational view of the expansion structure of the additional right electrical shift control device illustrated in FIGS. 5-13.

Referring to FIGS. 11-14, the handlebar mounting portion 30 basically includes a support member 36 and an expandable unit 38 coupled to the support member 36. The electrical switch portion 32 is detachably coupled to the support member 36 via the fasteners 34. The expandable unit 38 is coupled to the handlebar 14 to mount the shift control device 13R to the handlebar 14. Specifically, the expandable unit 38 is slidable within the free end F of the handlebar 14 in a first (unexpanded) configuration and non-slidable within the free end F of the handlebar 14 in a second (expanded) configuration, as best seen in FIGS. 12 and 13, respectively, and explained below in more detail.

The support member 36 basically includes a support base 40, a pair of side switch supports 42, a projecting section 44 and a pair of handlebar support elements 46. Preferably, the support base 40, the pair of side switch supports 42, the projecting section 44 and the pair of handlebar support elements 46 are integrally formed together as a one-piece, unitary member from a lightweight, rigid material such as cast aluminum.

The support base 40 is a substantially plate shaped member with the side switch supports 42 extending axially in one direction and the projecting section 44 and the handlebar support elements 46 extending axially in an opposite direction. A centrally located stepped bore 40a extends axially through the support base 40 and the projecting section 44 to receive part of the expandable unit 38. A slot or wire opening is formed in the support base 40 circumferentially between the handlebar support elements 46. A threaded through bore 42a is preferably formed in each side switch support 42 to receive one of the fasteners 34. The side switch supports 42 are spaced from each other to receive parts of the electrical switch portion 32 therebetween. Specifically, the side switch supports 42 configured to mate with parts of the electrical switch portion 32, as best seen in FIGS. 5, 8, 9, 11-13 and 18-20.

The expandable unit 38 basically includes a fixing member 50, an axially movable member 52, a plurality of expansion members 54 and a resilient element 56. The expansion members 54 and the resilient element 56 form parts of an expansion structure of the expandable unit 38. Specifically, the expansion members 54 and the resilient element 56 (i.e., the expansion structure) cooperate with the projecting section 44, the axially movable member 52 and the fixing member 50 to retain the expandable unit 38 within the free end F of the handlebar 14. More specifically, axially movable member 52 moves axially towards the projecting section 44 in response to rotational movement of the fixing member 50 such that the expansion members 54 and the resilient element 56 (i.e., the expansion structure) moves radially outwardly.

Referring to FIGS. 11-13, the parts of the expandable unit 38 will now be discussed in more detail. The fixing member 50 is preferably a conventional bolt having a threaded shaft 50a and an enlarged head 50b with a hexagonal bore. The shaft 50a is received through the stepped bore 40a of the support member 36, while the enlarged head 50b is disposed in the stepped bore 40a. The axially movable member 52 is preferably a circular shaped member as viewed in an axial direction. The axially movable member 52 includes a threaded bore 52a and a wedge surface 52b. The threaded bore 52a threadedly receives the threaded shaft 50a such that rotation of the fixing member or bolt 50 axially moves the axially movable member 52. The wedge surface 52b is a fructoconical surface configured to cooperate with the expansion members 54.

The expansion members 54 are preferably curved, arc-shaped members that are circumferentially arranged about a longitudinal axis of the fixing member 50 to move radially outwardly upon axially moving the axially movable member 52, as best seen in FIGS. 11-14. Preferably, the expandable unit 38 includes three of the expansion members 54. Each expansion member 54 includes a pair of opposed, arc-shaped inclined surfaces 54a and 54b, and an outer groove 54c. The arc shaped inclined surfaces 54a of the expansion members 54 form a substantially frustoconically shaped wedge surface of the expansion structure, while arc shaped inclined surfaces 54b of the expansion members 54 form another substantially frustoconically shaped wedge surface of the expansion structure. The arc shaped inclined surfaces 54a contact the projecting section 44, while the arc-shaped inclined surfaces 54b contact the wedge surface 52b of the axially movable member 52.

Specifically, the projecting section 44 is preferable a circular shaped member as viewed axially with a wedge surface 44a. The wedge surface 44a is preferably a fructoconical surface substantially identical to the wedge surface 52b. The arc shaped inclined surfaces 54a of the expansion members 54 contact the wedge surface 44a of the projecting section 44. Thus, when the fixing member 50 is rotated to move the axially movable member 52 toward the support base 40 of the support element 36, the wedge surfaces 44a and 52b cooperate with the arc-shaped inclined surfaces 54a and 54b, respectively, to move the expansion members 54 and resilient element 56 (i.e., the expansion structure) radially outwardly. When the fixing member 50 is tightened.

The resilient element 56 is preferably a continuous annular O-ring that is constructed of a resilient material such as rubber. The resilient element 56 extends around the expansion members 54 to retain the expansion members 54 together with the fixing member 50 and the axially movable member 52. Specifically, the resilient element 56 is received in the grooves 54c of the expansion members 54 so the expansion members 54 do not become accidentally misplaced during assembly.

The wedge surface 44a can be considered a first wedge surface, while the arc-shaped inclined surfaces 54a together can be considered a second wedge surface of the expansion structure. In such an arrangement, the wedge surface 52b can be considered a third wedge surface, while the arc-shaped inclined surfaces 54b together can be considered a fourth wedge surface of the expansion structure. Alternatively, the wedge surface 52b can be considered a first wedge surface, while the arc-shaped inclined surfaces 54b together can be considered a second wedge surface of the expansion structure. In such an arrangement, the wedge surface 44a can be considered a third wedge surface, while the arc-shaped inclined surfaces 54a together can be considered a fourth wedge surface of the expansion structure.

Referring to FIGS. 5 and 11-13, assembly and mounting of the electrical shift control device 13R will now be explained in more detail. Preferably, the handlebar mounting portion is assembled and then coupled to the free end F of the handlebar 14. Then the assembled electrical switch portion 32 can be coupled to the handlebar mounting portion 30 via the fasteners 34. The electrical switch portion 32 can be basically pre-assembled as shown in FIG. 12 with the cord 58 extending outwardly therefrom.

The handlebar mounting portion 30 is assembled by first positioning the fixing member 50 with the enlarged head 50b in the stepped bore 40a of the support member 36. Then the expansion structure (i.e., the expansion members 54 and the resilient element 56) and the axially movable member 52 are mounted on the threaded shaft 50a of the fixing member. The axially movable member 52 can be mounted before or after the expansion structure (i.e., the expansion members 54 and the resilient element 56) due to the arrangement of the expansion structure with separate expansion members 54.

In either case, the fixing member 50 and the axially movable member should be rotated relative to each other until the wedge surfaces 44a and 52b of the projecting section 44 and the axially movable member 52, respectively at least partially contact the arc-shaped inclined surfaces 54a and 54b, respectively. Thus, the expansion members 54 will be retained with the fixing member 50 and the axially movable member 52, and the expansion members 54 will not become accidentally misplaced. However, the fixing member 50 should not be tightened too far.

In particular, if the fixing member 50 is tightened too far, the expandable unit 38 may not fit in the free end F of the handlebar 14. In other words, the fixing member 50 should be tightened sufficiently to retain the expansion members 54 and the resilient element 56, but also such that the expansion members 54 are not moved radially outwardly beyond the inner diameter of the free end F of the handlebar 14. The expandable unit 38 can then be inserted into the free end F of the handlebar 14 until the support base 40 of the support member 36 contacts the end surface of the free end F of the handlebar 14. Then the fixing member 50 is rotated to axially move the axially movable member 52 toward the support base, and thus, to radially expand the expansion structure (i.e., the expansion members 54 and the resilient element 56). The fixing member 50 is tightened until the expansion structure engages the inner surface of the free end F of the handlebar 14 to frictionally retain the expandable unit therein. The electrical switch portion 32 is then fixedly coupled to the handlebar mounting portion 30 with the fasteners 34.

Referring to FIGS. 2-20, the electrical switch portion 32 will now be explained in more detail. The electrical switch portion 32 is electrically coupled to an electrical cord 58 having an electrical conductor 58a, an electrical conductor 58b and an electrical conductor 58c. The electrical switch portion 32 basically includes a housing 60, an operating member 61, an electrical contact assembly 62 and an end cover 63, as seen in FIG. 12. The operating member 61 is rotatably coupled to the housing 60 and operatively coupled to the electrical contact assembly 62 to be selectively moved relative to the handlebar mounting portion 30 (i.e., to first and second actuating positions from a neutral, rest position). The electrical contact assembly 62 is mounted within the housing 60 and is configured and arranged to be operated by the operating member 61.

The end cover 63 is basically a partial cup shaped member having a mounting flange 63a and a recess 63b as best seen in FIGS. 11-13. The mounting flange 63a has a pair of through bores for receiving the fasteners 34 to fixedly couple the electrical switch portion 32 to the handlebar mounting portion 30. The recess 63b rotatably receives part of the operating member 61. In particular, the end cover rotatably supports the outer end of the operating member 61 as best seen in FIG. 13.

Figure 15:
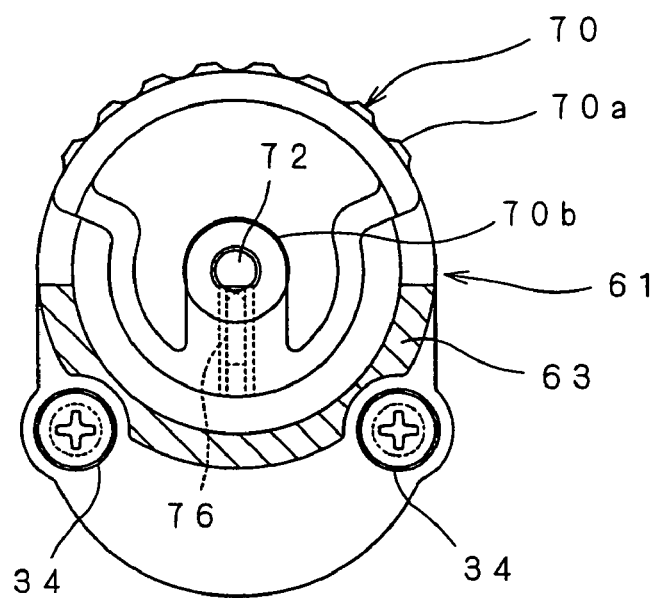
FIG. 15 is a partial cross-sectional view of the additional right electrical shift control device illustrated in FIGS. 5-14 as seen along section line 15-15 of FIG. 5, with the operating member in the neutral position.
Figure 16:
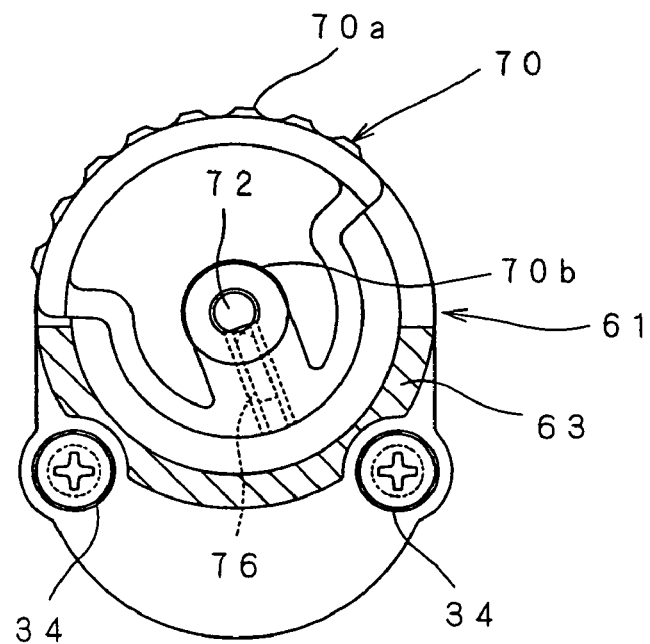
FIG. 16 is a partial cross-sectional view of the additional right electrical shift control device illustrated in FIGS. 5-14 as seen along section line 15-15 of FIG. 5, with the operating member in first actuating position.
Figure 17:
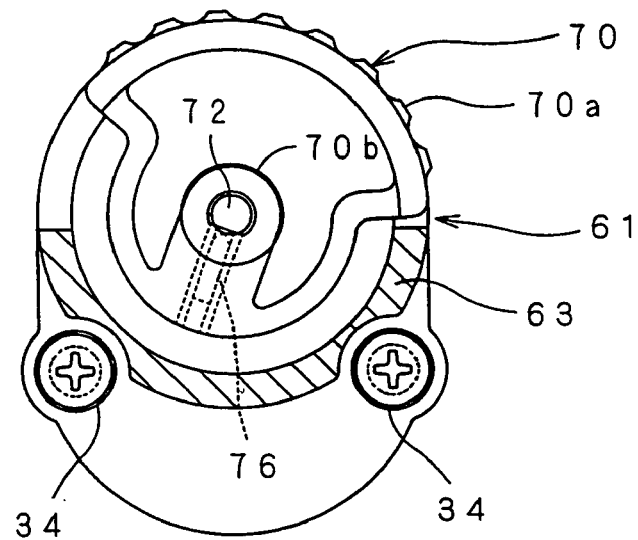
FIG. 17 is a partial cross-sectional view of the additional right electrical shift control device illustrated in FIGS. 5-14 as seen along section line 15-15 of FIG. 5, with the operating member in a second actuating position.

The electrical contact assembly 62 is electrically coupled to the electrical contacts 58a-58c of the electrical cord 58. As explained below in more detail, the electrical switch portion 32 (i.e., the operating member 61) has a first actuating or upshift position, a second actuating or downshift position and a neutral or rest position located between the first and second actuating positions as best seen in FIGS. 15-17. Accordingly, the electrical switch portion 32 (i.e., the operating member 61) can be utilized for both upshifting and downshifting one of the derailleurs 16 and 20. The first and second actuating positions (FIGS. 16 and 17) are arranged on opposite sides of the neutral position (FIG. 15).

Of course, it will be apparent to those skilled in the art from this disclosure that the upshifting and downshifting positions of the operating member 61 could be reversed if needed and/or desired, depending on how the cord 58 is connected. In other words, the additional electrical shift control devices 13R and 13L are preferably identical. However, the cords 58 can be connected in the same manner or differently so the additional electrical shift control devices 13R and 13L operate in the same manner or slightly different manners. For example, one of the additional electrical shift control devices 13R and 13L can be connected to its respective cord 58 such that a particular actuating movement (clockwise movement of the operating member 61) produces an upshift, while the other of the additional electrical shift control devices 13R and 13L can be connected to its respective cord 58 such that a particular actuating movement (clockwise movement of the operating member 61) produces a downshift, and vice versa.

Preferably, the housing 60 is constructed of two pieces. For example, the housing 60 as illustrated, includes a cup-shaped base element 64 and a cover element 66 that is coupled to the base element 64. The base element 64 and cover element 66 are each preferably constructed of a hard rigid material such as a hard rigid plastic or metal material. The electrical contact assembly 62 is housed within the housing 60 between the base element 64 and the cover element 66 and electrically coupled to the electrical conductors 58a-58c of the electrical cord 58, as mentioned above.

Figure 18:
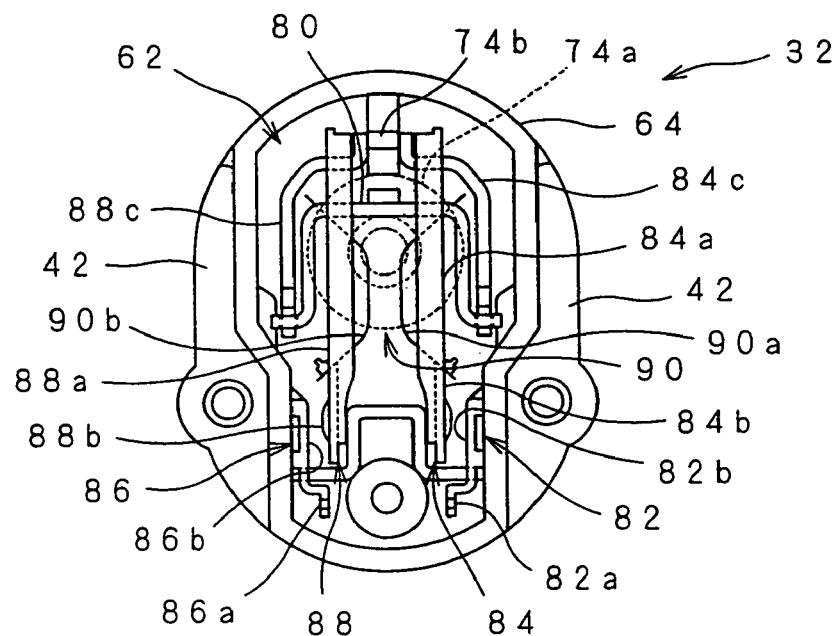
FIG. 18 is an elevational view of the electrical shift control switch of illustrated in FIG. 12 of the additional right electrical shift control device illustrated in FIGS. 5-17 with the cover element removed and part of the operating member partially illustrated in hidden lines in order to show the electrical shift control switch in the neutral position (FIG. 15), i.e., the movable contacts spaced from the stationary contacts so that no electrical connection is made between the contacts.
Figure 19:
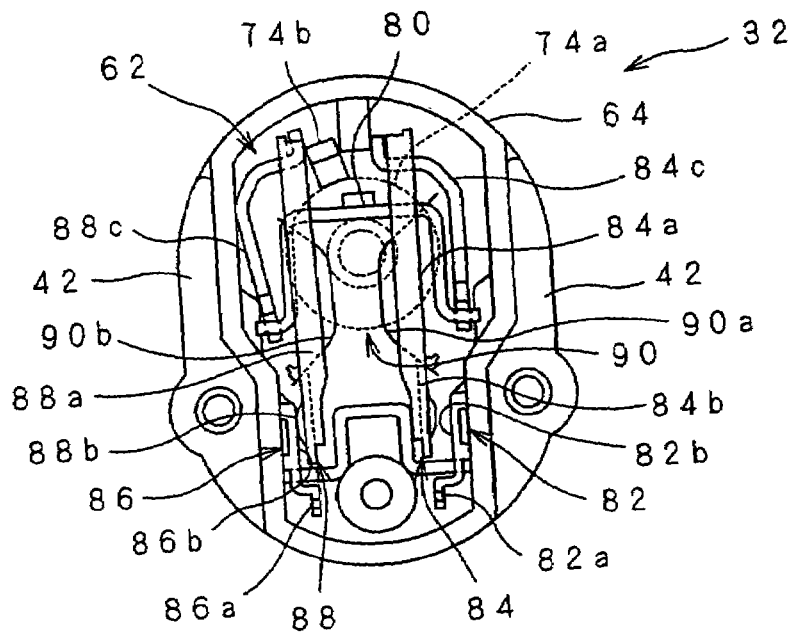
FIG. 19 is an elevational view of the electrical shift control switch illustrated in FIG. 12 of the additional right electrical shift control device illustrated in FIGS. 5-17 with the cover element removed and part of the operating member partially illustrated in hidden lines in order to show the electrical shift control switch in the first, upshift position (FIG. 16), i.e., one of the movable contacts one of the stationary contacts so that an electrical connection is established between the contacts.
Figure 20:
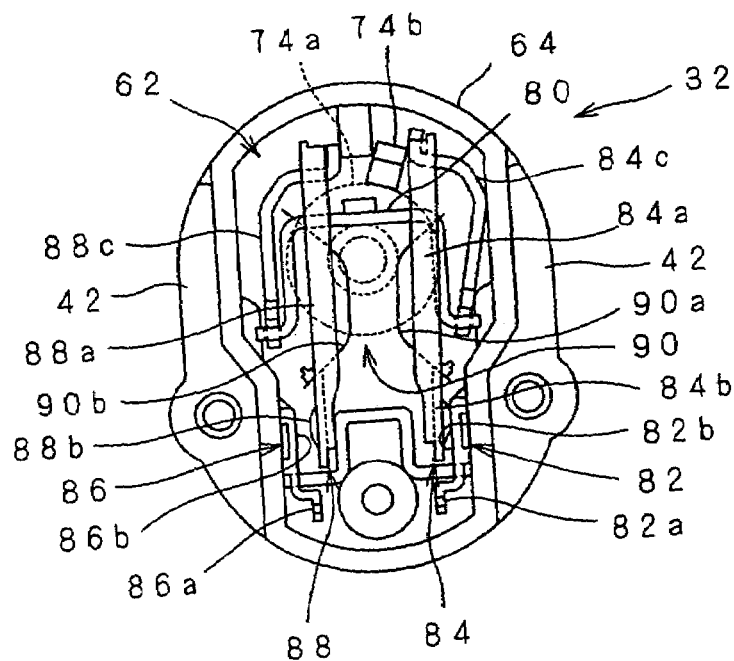
FIG. 20 is an elevational view of the electrical shift control switch illustrated FIG. 12 of the additional right electrical shift control device illustrated in FIGS. 5-17 with the cover element removed and part of the operating member partially illustrated in hidden lines in order to show the electrical shift control switch in the second, downshift position (FIG. 17), i.e., one of the movable contacts one of the stationary contacts so that an electrical connection is established between the contacts.
Figure 21:
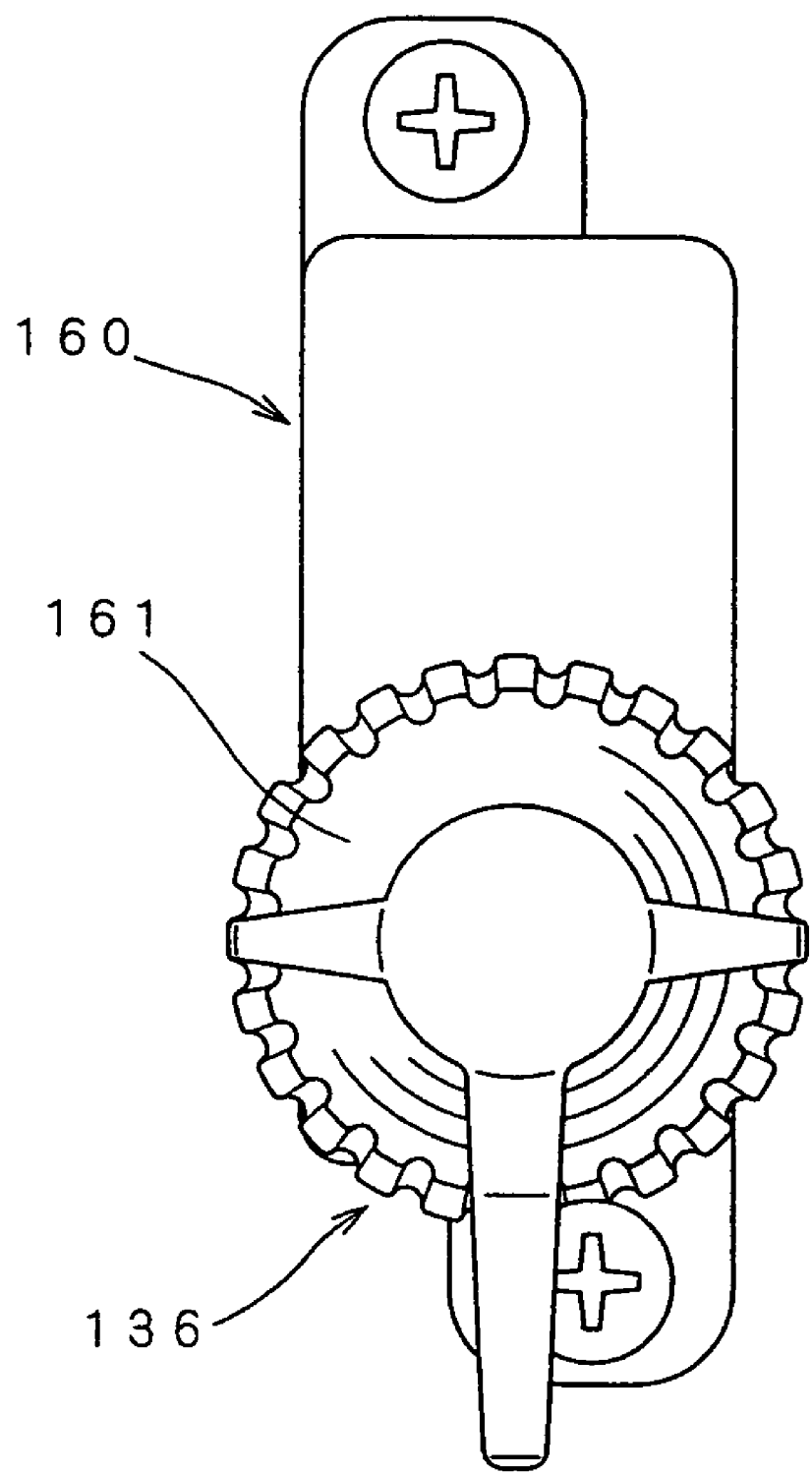
FIG. 21 is an elevational view of one of the electrical shift control switches illustrated in FIGS. 2 and 3 for either the right or left hand side brake/shift control device in accordance with the present invention.

Preferable, the base element 64 includes a mounting abutment 64a and a wire opening 64b. The mounting abutment 64a is configured and arranged to be received within the support base 40 of the support member 36 to prevent relative lateral movement therebetween (i.e., in the upper, vertical direction), as best seen in FIG. 12. The external shape of the base element 64 is further configured to prevent lateral movement (i.e., side to side and in the lower, vertical directions) relative to the support member 36 as best seen in FIGS. 18-20.

Figure 7:
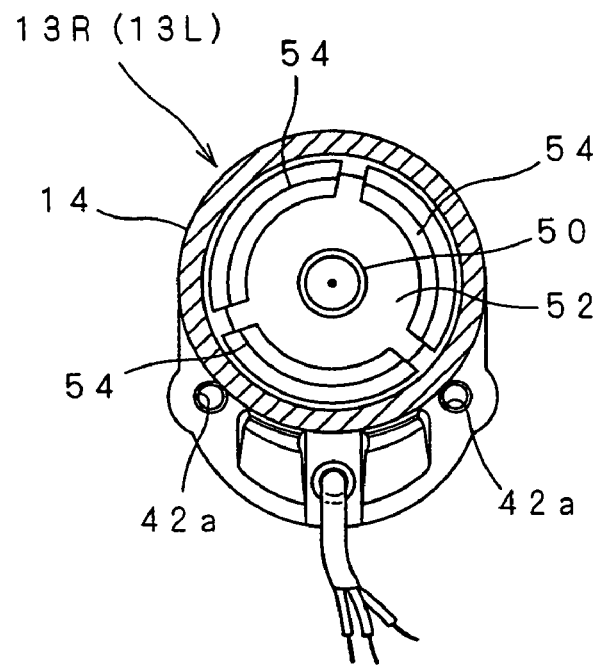
FIG. 7 is a cross-sectional view of the part of the end of the right hand side portion of the bicycle handlebar illustrated in FIGS. 5 and 6 with the additional right electrical shift control device coupled thereto as seen along section line 7-7 of FIG. 5.
Figure 8:
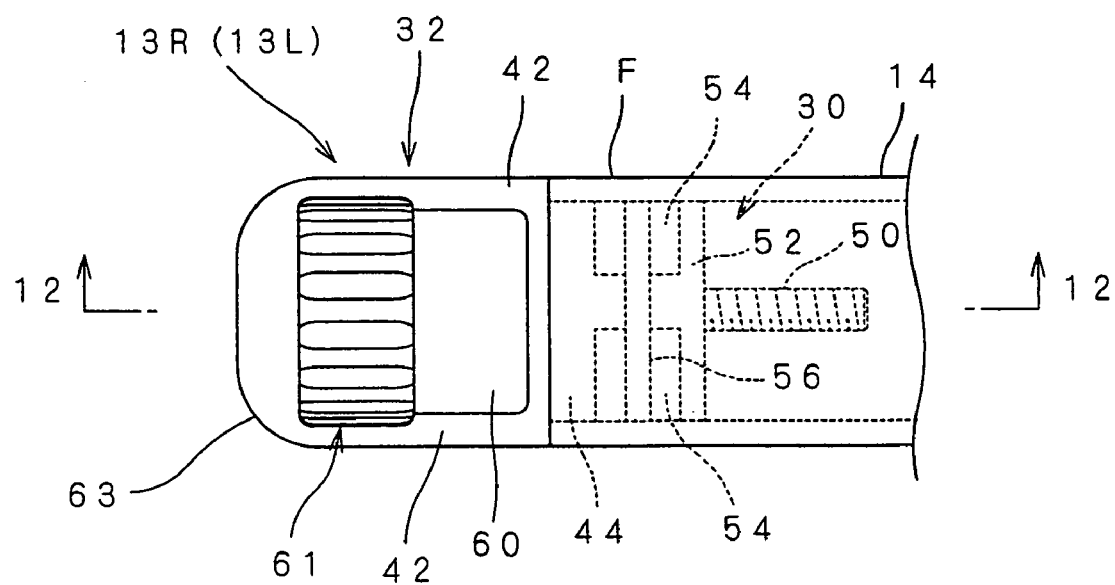
FIG. 8 is a partial top plan view of the part of the end of the right hand side portion of the bicycle handlebar illustrated in FIGS. 5-7 with the additional right electrical shift control device coupled thereto.
Figure 9:
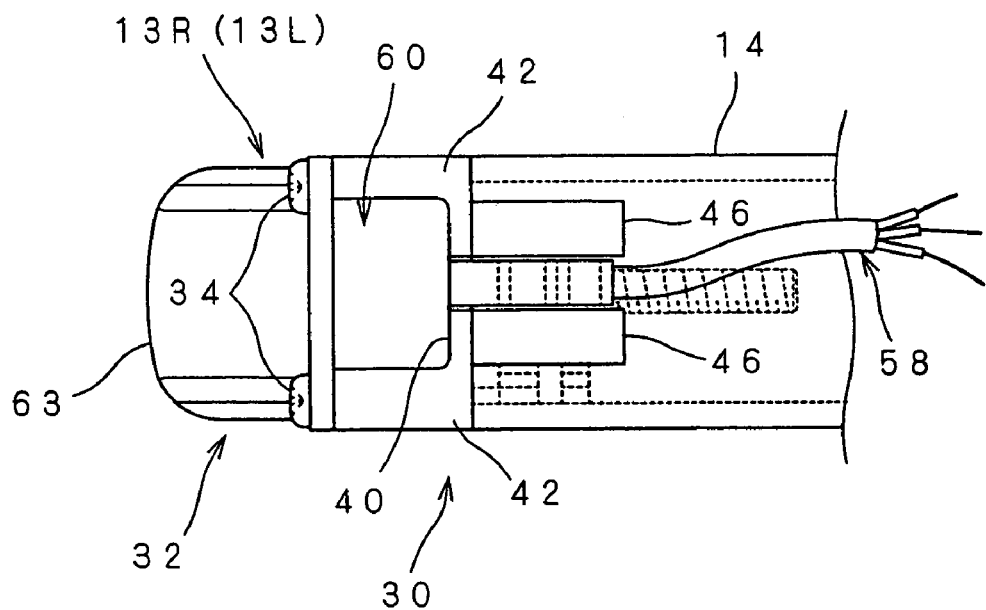
FIG. 9 is a partial bottom plan view of the part of the end of the right hand side portion of the bicycle handlebar illustrated in FIGS. 5-8 with the additional right electrical shift control device coupled thereto.
Figure 10:
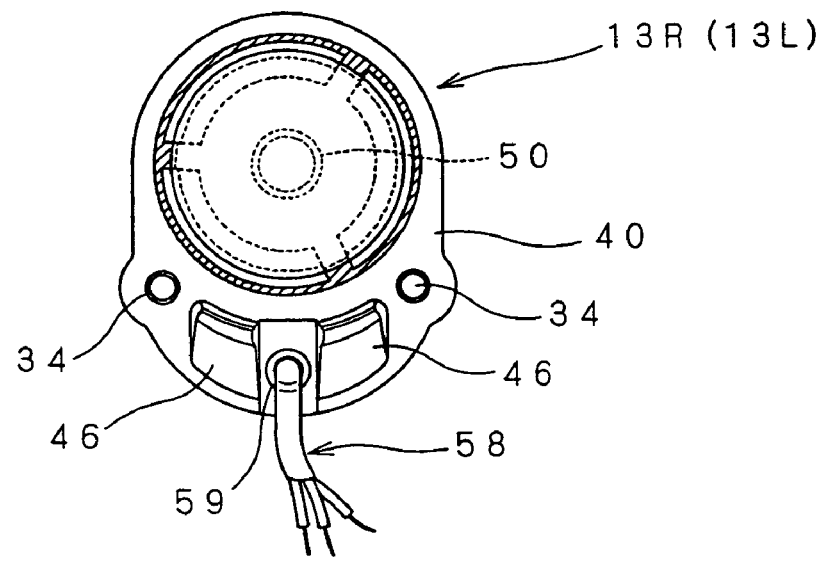
FIG. 10 is an end elevational view of the additional right electrical shift control device illustrated in FIGS. 5-9, removed from the end of the handlebar for the purpose of illustration.

The wire opening 64b is configured and arranged to receive a rubber wire mounting member 59 that has the cord 58 extending outwardly therethrough as best seen in FIG. 12. The wire opening 64b, and thus, the mounting member 59 and the cord 58 are preferably circumferentially arranged between the handlebar support elements 46, as best seen in FIGS. 7, 9 and 10. The wire mounting member 59 seals the wire opening 64b so that a filler material such an epoxy resin filler material can be retained in the area B after all electrical connections between the cord 58 and the electrical switch portion 32 are made.

The operating member 61 is mounted between the cover element 66 of the housing 60 and the end cover 63 of the electrical switch portion 32 such that rotational movement of the operating member 61 causes the electrical contact assembly 62 to move from a normal or rest position to one of the two actuating positions as explained below. The operating member 61 basically has an actuator 70, a pivot shaft 72 and a toggle member 74. The actuator 70 is fixedly attached the outer end of the pivot shaft 72 by a set pin 76 that contacts a flat portion of the outer end of the pivot shaft 72. The inner end of the pivot shaft 72 has the toggle member 74 fixedly coupled thereto. Thus, rotation of the actuator 70 by the rider causes the pivot shaft 72 and the toggle member 74 to rotate therewith.

Preferably, a bearing assembly 78 is positioned between the cover element 66 of the housing 60 and the pivot shaft 72 such that the operating member 61 pivots or rotates smoothly about a rotational operating axis or pivot axis X. Preferably, the pivot axis X of the operating member 61 is parallel to and aligned with a center axis C of the free end F of the handlebar 14. A biasing element (coil spring) 79 is positioned between the cover element 66 of the housing 60 and the toggle member 74 to normally bias the toggle member 74, and thus, the operating member 61 to the normal rest or neutral position. In particular, one end of the spring 79 is preferably received in an axial hole (not shown) of the cover element 66, while the other end of the spring 79 is preferably received in an axial hole (not shown) of the toggle member 74. The axial holes (not shown) and the spring 79 are preferably arranged and configured to bias the operating member 61 to the neutral rest position from the first and second actuating positions.

Specifically, the toggle member 74 has an annular mounting portion 74a with the axial hole (not shown) formed therein and an axially extending projection 74b located at the radially outermost edge of the mounting portion 74a. The mounting portion 74a preferably has a non-circular opening with a portion of the pivot shaft 72 non-rotatably received therein. The axially extending projection 74b engages the electrical contact assembly 62 in response to rotation of the operating member 61, as explained below.

The actuator 70 basically includes a curved operating section 70a and a central attachment section 70b with a connecting section extending between the operating section 70a and the attachment section 70b. The curved operating section 70a has a textured outer surface as best seen in FIGS. 15-17. In particular, the curved operating section 70a preferably includes a plurality of axially extending grooves to facilitate engagement with the rider's thumb, fingers or hand. Thus, the curved operating section 70a is a hand actuating section. Despite the texture, the operating section 70a has an overall curvature substantially corresponding to the curvature of the free end F of the handlebar 14 relative to the rotational axis X and the center axis C, as best understood from FIGS. 5-17. The curved operating section 70a is preferably circumferentially arranged on a substantially opposite side of the electrical bicycle shift control device 13R from the handlebar support elements 46.

As seen in FIGS. 18-20, the electrical contact assembly 62 preferably includes a common contact bar 80, a first stationary contact 82, a first movable (upshift) contact 84, a second stationary contact 86, a second movable (downshift) contact 88 and a biasing element 90 formed of a pair of leaf springs 90a and 90b. Generally, when the electrical switch portion 32 (i.e., the operating member 61) is in the rest/neutral position, axially extending projection 74b of the toggle member 74 (i.e. of the operating member 61) is located centrally between the first and second movable contacts 84 and 88. In particular, the biasing element 90 holds the toggle member 74 of the operating member 61 in the rest position between the first and second movable contacts 84 and 88. The spring 79 also holds the toggle member 74 in the rest position.

However, when the rider rotates the actuator 70 of the operating member 61, this causes the pivot shaft 72 to pivot the toggle member 74 such that the axially extending projection 74b is pressed against one of the movable contacts 84 and 88. This pivotal movement of the toggle member 74 causes one of the movable contacts 84 and 88 to be deflected such that the deflected movable contact directly contacts the corresponding one of the stationary contacts 82 and 86. More specifically, when the actuator 70 of the operating member 61 is rotated in a clockwise direction (as seen in FIG. 20), the toggle member 74 deflects the first movable contact 84 such that the first movable contact 84 contacts the first stationary contact 82. Thus, an electrical connection is made between the first stationary contact 82 and the first movable contact 84 such that an upshift control signal is sent to the cycle computer 24, which in turn operates one of the derailleurs 16 and 20 to cause an upshift to occur. If the actuator 70 of the operating member 61 is rotated in a counterclockwise direction (as seen in FIG. 19), a downshift of one of the derailleurs 16 and 20 occurs. In particular, rotation of the actuator 70 of the operating member 61 causes the toggle member 74 to deflect the second movable contact 88 against the second stationary contact 86 to result in an electrical connection therebetween. This electrical connection causes a control signal to be inputted into the cycle computer 24 such that a downshift control signal is sent to one of the derailleurs 16 and 20.

The cycle computer 24 is electrically coupled to the electrical switch portion 32 via the electrical cord 58, as mentioned above. In particular, the first electrical conductor 58a of the electrical cord 58 is electrically connected to the common contact bar 80. The second electrical conductor 58b of the electrical cord 58 is electrically connected to the first stationary contact 82, while the third electrical conductor 58c of the electrical cord 58 is electrically connected the second stationary contact 86. When the first contacts 82 and 84 are touching, the first conductor 58a is electrically connected to the second electrical conductor 58b to transmit an upshift control signal to the cycle computer 24. On the other hand, when the second contacts 86 and 88 are touching, the first conductor 58a is electrically connected to the third electrical conductor 58c to transmit a downshift control signal to the cycle computer 24.

Basically, the first stationary contact 82 includes a wiring plate 82a and a contact element 82b with a first stationary engagement surface. The first stationary contact 82 is constructed of a rigid electrical conductive material such as those known in the art. The first stationary contact 82 is fixedly secured to the housing 60 when the base element 64 and the cover element 66 are fixedly coupled together. The second electrical conductor 58*b* of the electrical cord 58 is electrically connected to the first stationary contact 82 by soldering or otherwise attaching the conductor to the wiring plate 82*a*.

The first movable contact 84 includes a first mounting element 84*a* with a contact element 84*b* mounted on one end of the first mounting element 84*a*, and a second mounting element 84*c* coupled to the other end of the first mounting element 84*a*. The elements 84*a*-84*c* of the first movable contact 84 are constructed of rigid electrical conductive materials such that an electrical path is created by these elements. The first mounting element 84*a* is swingably mounted to the common contact bar 80 and the second mounting element 84*c* such that the first mounting element 84*a* moves between a normal or rest position and an actuating position in response to the clockwise rotation of the actuator 70 of the operating member 61. Thus, the contact element 84*b* has a movable engagement surface that is arranged and configured to move with the first mounting element 84*a* when the operating member 61 is operated. In other words, the movable engagement surface of the contact element 84*b* of the first movable contact 84 selectively moves into electrical engagement with the first stationary engagement surface of the contact element 82*b* of the first stationary contact 82 upon clockwise rotation of the actuator 70 of the operating member 61 to the first actuating or upshift position.

The second mounting element 84*c* is coupled between the common contact bar 80 and the free end of the first mounting element 84*a* to control the swinging or pivotal movement of the first mounting element 84*a*. Thus, the second mounting element 84*c* is pivotally mounted at its first end to the common contact bar 80 and at its second end to the first mounting element 84*a*. One end of the leaf spring 90*a* of the biasing element 90 is coupled to the common contact bar 80, while the other end of the leaf spring 90*a* is coupled to the first mounting element 84*a* such that the first and second mounting elements 84*a* and 84*c* urge the toggle member 74 of the operating member 61 to the center rest position and the contact element 84*b* out of engagement with the stationary contact element 82*b*.

This arrangement of the leaf spring 90*a* together with the first and second mounting elements 84*a* and 84*c* form an audible clicking element that is configured and arranged to produce an audible sound that occurs upon selective movement of the operating member 61 to the first actuating position. In other words, an audible clicking sound occurs simultaneous with the movable engagement surface of the contact element 84*b* engaging the stationary engagement surface of the contact element 82*b*.

Basically, the second stationary contact 86 includes a wiring plate 86*a* and a contact element 86*b* with a second stationary engagement surface. The second stationary contact 86 is constructed of a rigid electrical conductive material such as those known in the art. The second stationary contact 86 is fixedly secured to the housing 60 when the base element 64 and the cover element 66 are fixedly coupled together. The third electrical conductor 58*c* of the electrical cord 58 is electrically connected to the second stationary contact 86 by soldering or otherwise attaching the conductor to the wiring plate 86*a*.

The second movable contact 88 includes a first mounting element 88*a* with a contact element 88*b* mounted on one end of the first mounting element 88*a*, and a second mounting element 88*c* coupled to the other end of the first mounting element 88*a*. The elements 88*a*-88*c* of the second movable contact 88 are constructed of rigid electrical conductive materials such that an electrical path is created by these elements. The first mounting element 88*a* is swingably mounted to the common contact bar 80 and the second mounting element 88*c* such that the first mounting element 88*a* moves between a normal or rest position and an actuating position in response to the counterclockwise rotation of the actuator 70 of the operating member 61. Thus, the contact element 88*b* has a movable engagement surface that is arranged and configured to move with the first mounting element 88*a* when the operating member 61 is operated. In other words, the movable engagement surface of the contact element 88*b* of the second movable contact 88 selectively moves into electrical engagement with the second stationary engagement surface of the contact element 86*b* of the second stationary contact 86 upon counterclockwise rotation of the actuator 70 of the operating member 61 to the second actuating or downshift position.

The second mounting element 88*c* is coupled between the common contact bar 80 and the free end of the first mounting element 88*a* to control the swinging or pivotal movement of the first mounting element 88*a*. Thus, the second mounting element 88*c* is pivotally mounted at its first end to the common contact bar 80 and at its second end to the first mounting element 88*a*. One end of the leaf spring 90*b* of the biasing element 90 is coupled to the common contact bar 80, while the other end of the leaf spring 90*b* is coupled to the first mounting element 88*a* such that the first and second mounting elements 88*a* and 88*c* urge the toggle member 74 of the operating member 61 to the center rest position and the contact element 88*b* out of engagement with the stationary contact element 86*b*.

This arrangement of the leaf spring 90*b* together with the first and second mounting elements 88*a* and 88*c* form an audible clicking element that is configured and arranged to produce an audible sound that occurs upon selective movement of the operating member 61 to the second actuating position. In other words, an audible clicking sound occurs simultaneous with the movable engagement surface of the contact element 88*b* engaging the stationary engagement surface of the contact element 86*b*.

Referring now to FIGS. 2-4, 21 and 22, the electrical shift/brake control devices 12R and 12L will now be explained in more detail. Basically, each of the electrical shift and brake control devices 12R and 12L includes a support member or brake lever bracket 130, a brake lever 132, and a pair of electrical shift control switches 136. In the control device 12R, the brake cable 18*a* is fixedly coupled to the brake lever 132 such that the inner wire is pulled when the rider squeezes the brake lever 132. Likewise, the brake cable 22*a* is fixedly coupled to the brake lever 132 of the control device 12L such that the inner wire is pulled when the rider squeezes the brake lever 132.

As best seen in FIG. 2, the cycle computer 24 is electrically coupled to the first and second electrical shift control switches 136 and 138 of each of the control devices 12R and 12L via a pair of electrical cords 154.

In particular, each of the electrical cords 154 has a pair of first electrical conductors 154*a*, a pair of second electrical conductors 154*b* and a pair of third electrical conductors 154*c*, which are electrical coupled to the electrical shift control switches 136 and 138. When one of the first conductors 154*a* is electrically connected to one of the second electrical conductors 154*b* via the electrical shift control switch 136 or 138, then a downshift signal is transmitted to the cycle computer 24. On the other hand, when one of the first conductors 154a is electrically connected to one of the third electrical conductors 154c via the electrical shift control switch 136 or 138, then an upshift signal is transmitted to the cycle computer 24. The cycle computer 24, the electrical switch portions 32, the first electrical shift control switches 136 and 138 form parts of the electrical shift control system of the present invention.

Figure 22:
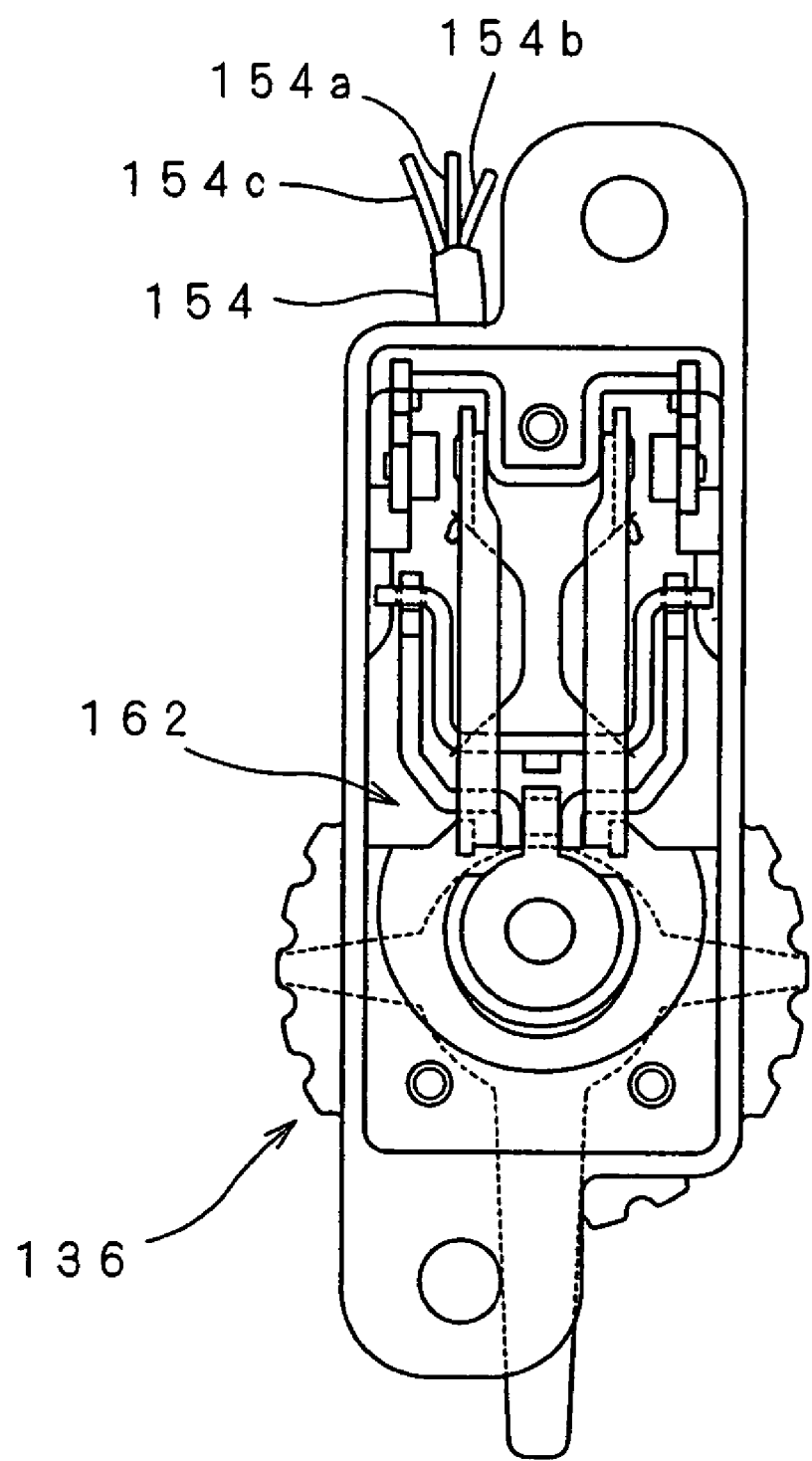
FIG. 22 is an elevational view of the electrical shift control switch illustrated in FIG. 22 with the base removed to show the electrical shift control switch in the neutral position, i.e., the movable contacts spaced from the stationary contacts so that no electrical connection is made between the contacts.

Basically, each of the electrical shift control switches 136 and 138 includes a housing 160, an operating member 161 and an electrical contact assembly 162, as seen in FIG. 22. The operating member 161 is rotatably coupled to the housing 160 and operatively coupled to the electrical contact assembly 162. The electrical contact assembly 162 mounted within the housing 160 and configured and arranged to be operated by the operating member 161. The construction of the electrical contact assembly 162 is the same as the electrical contact assembly 62, discussed above. Thus, the electrical shift control switches 136 and 138 will not be discussed or illustrated in detail herein. Rather the construction and operation of the electrical shift control switches 136 and 138 can be readily determined from the description of the electrical contact assembly 62, discussed above.

GENERAL INTERPRETATION OF TERMS

As used herein, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention.

The terms of degree such as "substantially", "about" and "approximately" as used herein mean a reasonable amount of deviation of the modified term such that the end result is not significantly changed. These terms should be construed as including a deviation of at least ±5% to 10% of the modified term if this deviation would not negate the meaning of the word it modifies. The term "actuating position" as used herein means a state in which an electrical connection is formed by an orientation of an operation member. The term "neutral position" as used herein means a state in which an electrical connection is not formed by an orientation of an operation member.

While only a selected embodiment has been chosen to illustrate the present invention, it will be apparent to those skilled in the art from this disclosure that various changes and modifications can be made herein without departing from the scope of the invention as defined in the appended claims. Furthermore, the foregoing descriptions of the embodiment according to the present invention are provided for illustration only, and not for the purpose of limiting the invention as defined by the appended claims and their equivalents.

What is claimed is:

1. An electrical bicycle shift control device comprising:
    a handlebar mounting portion that is configured to be fixedly mounted in a free end of a handlebar having a center axis defining an axial direction of the free end of the handlebar; and
    an electrical shift control switch portion fixedly mounted to the handlebar mounting portion, the electrical shift control switch portion including an operating member arranged and configured to be selectively moved relative to the handlebar mounting portion between a neutral position and a first actuating position,
    the operating member being axially arranged relative to the handlebar mounting portion such that the operating member does not axially overlap the free end of the handlebar when the handlebar mounting portion is fixedly mounted in the free end of the handlebar as viewed in a direction perpendicular to the axial direction.

2. The electrical bicycle shift control device according to claim 1, wherein
    the operating member is further arranged and configured to be selectively moved relative to the handlebar mounting portion between the neutral position and a second actuating position that is spaced from the first actuating position.

3. The electrical bicycle shift control device according to claim 1, wherein
    the operating member has a curved operating surface with a curvature substantially corresponding to a curvature of the free end of the handlebar.

4. The electrical bicycle shift control device according to claim 1, wherein
    the handlebar mounting portion has a support base with a contact surface arranged and configured to contact a free end edge of the free end of the handlebar when the handlebar mounting portion is fixedly mounted in the free end of the handlebar, and the operating member is axially spaced from the contact surface.

5. An electrical bicycle shift control device comprising:
    a handlebar mounting portion that is configured to be fixedly mounted in a free end of a handlebar; and
    an electrical shift control switch portion fixedly mounted to the handlebar mounting portion, the electrical shift control switch portion including an operating member and a biasing element,
    the operating member being arranged and configured to be selectively moved relative to the handlebar mounting portion between a neutral position and a first actuating position and being arranged and configured to be selectively moved relative to the handlebar mounting portion between the neutral position and a second actuating position that is spaced from the first actuating position, the biasing element being arranged and configured to urge the operating member to the neutral position.

6. The electrical bicycle shift control device according to claim 5, wherein
    the operating member of the electrical shift control switch portion is further arranged and configured to rotate about an operating axis between the neutral position and the first and second actuating positions.

7. The electrical bicycle shift control device according to claim 6, wherein
    the operating axis of the operating member is parallel to a center axis of the free end of the handlebar.

8. The electrical bicycle shift control device according to claim 5, wherein
    the operating member of the electrical shift control switch portion is further arranged and configured such that the first and second actuating positions are arranged on opposite sides of the neutral position.

9. An electrical bicycle shift control device comprising:
    a handlebar mounting portion that is configured to be fixedly mounted in a free end of a handlebar; and
    an electrical shift control switch portion fixedly mounted to the handlebar mounting portion, the electrical shift control switch portion including an operating member arranged and configured to be selectively moved relative to the handlebar mounting portion between a neutral position and a first actuating position, the electrical shift control switch portion being detachably coupled to the handlebar mounting portion such that the electrical shift control switch portion can be removed from the handlebar mounting portion without removing the handlebar mounting portion from the free end of the handlebar.

10. An electrical bicycle shift control device comprising:
a handlebar mounting portion that is configured to be fixedly mounted in a free end of a handlebar; and
an electrical shift control switch portion fixedly mounted to the handlebar mounting portion, the electrical shift control switch portion including an operating member arranged and configured to be selectively moved relative to the handlebar mounting portion between a neutral position and a first actuating position,
the handlebar mounting portion including a support member with the electrical shift control switch portion coupled thereto and an expandable unit coupled to the support member that is slidable within the free end of the handlebar in a first configuration and non-slidable in a second configuration.

11. The electrical bicycle shift control device according to claim 10, wherein
the expandable unit includes an axially movable member that moves in response to movement of a fixing member of the handle bar mounting portion, and an expansion structure that moves radially outwardly upon axially moving the axially movable member.

12. The electrical bicycle shift control device according to claim 11, wherein
the expansion structure includes a plurality of expansion members that are separate members from the axially movable member.

13. The electrical bicycle shift control device according to claim 12, wherein
the expansion members are curved members circumferentially arranged about a longitudinal axis of the fixing member to move radially outwardly upon axially moving the axially movable member.

14. The electrical bicycle shift control device according to claim 13, wherein
the expansion structure includes a resilient ring extending around the expansion members to retain the expansion members together with the fixing member and the axially movable member.

15. The electrical bicycle shift control device according to claim 11, wherein
the axially movable member includes a first wedge surface that cooperates with a second wedge surface of the expansion structure to move the expansion structure radially outwardly upon moving the fixing member.

16. The electrical bicycle shift control device according to claim 15, wherein
the support member includes a projecting section with a third wedge surface that cooperates with a fourth wedge surface of the expansion structure to move the expansion structure radially outwardly upon moving the fixing member.

17. The electrical bicycle shift control device according to claim 11, wherein
the support member includes a projecting section with a first wedge surface that cooperates with a second wedge surface of the expansion structure to move the expansion structure radially outwardly upon moving the fixing member.

18. The electrical bicycle shift control device according to claim 11, wherein
the expansion structure includes a resilient element that retains the expansion structure together with the fixing member and the axially movable member.

19. The electrical bicycle shift control device according to claim 11, wherein
the fixing member includes a threaded shaft and the axially movable member is threadedly mounted on the threaded shaft to move axially upon rotation of the threaded shaft.

20. The electrical bicycle shift control device according to claim 10, wherein
the support member includes at least one handlebar support element extending axially therefrom away from the electrical shift control switch portion that is configured and arranged to contact an external surface of the free end of the handlebar.

21. The electrical bicycle shift control device according to claim 20, wherein
the support member includes a pair of the handlebar support elements.

22. The electrical bicycle shift control device according to claim 21, wherein
the support member includes a wire opening circumferentially arranged between the handlebar support elements.

23. The electrical bicycle shift control device according to claim 21, wherein
the handlebar support elements are circumferentially arranged on a substantially opposite side of the electrical bicycle shift control device from a hand actuating section of the operating member.

* * * * *